(12) United States Patent
Kang et al.

(10) Patent No.: US 8,235,012 B2
(45) Date of Patent: Aug. 7, 2012

(54) METHOD FOR CONTROLLING COMBUSTION MODE TRANSITIONS IN AN INTERNAL COMBUSTION ENGINE

(75) Inventors: Jun-Mo Kang, Ann Arbor, MI (US);
Hanho Yun, Oakland Township, MI (US); Nicole Wermuth, Ann Arbor, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 386 days.

(21) Appl. No.: 12/686,649

(22) Filed: Jan. 13, 2010

(65) Prior Publication Data

US 2011/0168130 A1 Jul. 14, 2011

(51) Int. Cl.
*F01L 1/34* (2006.01)
*F02B 17/00* (2006.01)
*F02B 47/08* (2006.01)

(52) U.S. Cl. .................. 123/90.15; 123/295; 123/568.14

(58) Field of Classification Search ............... 123/90.15, 123/90.16, 90.17, 568.14, 295
See application file for complete search history.

(56) References Cited

U.S. PATENT DOCUMENTS

| 6,655,345 | B2 * | 12/2003 | Ogawa et al. ................. 123/295 |
| 6,742,494 | B2 * | 6/2004 | Unger et al. .................. 123/305 |
| 6,769,404 | B2 * | 8/2004 | Aoyama et al. .......... 123/406.29 |
| 6,827,051 | B2 * | 12/2004 | Kawasaki et al. .......... 123/90.15 |
| 6,842,691 | B2 * | 1/2005 | Hagner et al. ................. 701/115 |
| 7,128,051 | B2 * | 10/2006 | Nogi et al. ..................... 123/336 |
| 7,143,753 | B2 * | 12/2006 | Tanaka et al. ............. 123/568.14 |
| 7,174,880 | B2 * | 2/2007 | Henn et al. ..................... 123/436 |
| 7,275,514 | B2 * | 10/2007 | Kuo et al. ....................... 123/299 |
| 7,287,497 | B2 * | 10/2007 | Sun et al. ..................... 123/90.12 |
| 7,308,872 | B2 * | 12/2007 | Sellnau et al. ............. 123/90.16 |
| 7,314,041 | B2 * | 1/2008 | Ogawa et al. ............ 123/568.14 |
| 7,360,523 | B2 * | 4/2008 | Sloane et al. ................. 123/305 |
| 7,392,797 | B2 * | 7/2008 | Ogawa et al. ............ 123/568.14 |
| 7,444,999 | B2 * | 11/2008 | Kitamura et al. ........ 123/568.11 |
| 7,540,270 | B2 * | 6/2009 | Kang et al. ..................... 123/295 |
| 7,689,344 | B2 * | 3/2010 | Kang et al. ..................... 701/103 |
| 7,689,345 | B2 * | 3/2010 | Wiggins et al. .............. 701/103 |
| 7,742,868 | B2 * | 6/2010 | Kang et al. ..................... 701/105 |
| 7,801,665 | B2 * | 9/2010 | Buckland et al. ............. 701/103 |
| 7,987,040 | B2 * | 7/2011 | Buckland et al. ............. 701/103 |
| 8,001,951 | B2 * | 8/2011 | Ellmer et al. ................. 123/435 |
| 8,061,318 | B2 * | 11/2011 | Cleary et al. ............... 123/90.17 |
| 8,091,527 | B1 * | 1/2012 | Brown et al. ................. 123/295 |
| 2003/0154965 | A1 * | 8/2003 | Koch ......................... 123/568.14 |
| 2005/0183693 | A1 * | 8/2005 | Yang et al. ..................... 123/305 |
| 2007/0272202 | A1 * | 11/2007 | Kuo et al. ....................... 123/295 |
| 2008/0162020 | A1 * | 7/2008 | Itoga et al. ..................... 701/108 |
| 2008/0162021 | A1 * | 7/2008 | Itoga et al. ..................... 701/108 |
| 2009/0229564 | A1 * | 9/2009 | Kang et al. ..................... 123/295 |
| 2009/0240422 | A1 * | 9/2009 | Itoga et al. ..................... 701/108 |
| 2009/0272363 | A1 * | 11/2009 | Yun et al. ....................... 123/295 |
| 2010/0180876 | A1 * | 7/2010 | Leroy et al. ................... 123/704 |
| 2010/0228466 | A1 * | 9/2010 | Ekchian et al. ............... 701/113 |
| 2010/0242902 | A1 * | 9/2010 | Kang et al. ..................... 123/305 |
| 2011/0017157 | A1 * | 1/2011 | Itoga ......................... 123/90.15 |

* cited by examiner

*Primary Examiner* — Thomas Moulis

(57) ABSTRACT

An engine is transitioned from a first combustion mode to a second combustion mode. Phase and lift of the intake and exhaust valves are sequentially adjusted corresponding to intake air cylinder volume and residual gas cylinder volume corresponding to the first and second combustion modes.

19 Claims, 3 Drawing Sheets

METHOD FOR CONTROLLING COMBUSTION MODE TRANSITIONS IN AN INTERNAL COMBUSTION ENGINE

TECHNICAL FIELD

This disclosure relates to operation and control of internal combustion engines, and more specifically to controlling transitions in engine combustion modes.

BACKGROUND

The statements in this section merely provide background information related to the present disclosure and may not constitute prior art.

Known spark-ignition (SI) engines introduce an air-fuel mixture into each cylinder which is compressed in a compression stroke and ignited by a spark plug to generate power transferable to a crankshaft. Known compression ignition engines inject pressurized fuel into a combustion cylinder near top dead center (TDC) of the compression stroke which ignites upon injection to generate power transferable to a crankshaft. Combustion for both a gasoline engine and a diesel engine involves premixed or diffusion flames controlled by fluid mechanics.

An engine configured for SI operation including direct fuel-injection can operate in a controlled auto-ignition combustion mode, also referred to as homogeneous charge compression ignition (HCCI) under predetermined speed/load operating conditions. The controlled auto-ignition combustion mode includes a distributed, flameless, auto-ignition combustion process that is controlled by oxidation chemistry. An engine operating in the controlled auto-ignition combustion mode has an intake air/fuel charge that is preferably homogeneous in composition, temperature, and residual exhaust gases at intake valve closing time. The controlled auto-ignition combustion results in a distributed kinetically-controlled combustion with the engine operating at a dilute air-fuel mixture, i.e., a mixture that is lean of stoichiometry. This engine operation results in relatively low peak combustion temperatures and low NOx emissions. The homogeneous air-fuel mixture minimizes occurrences of rich zones that form smoke and particulate emissions.

In engine operation, the engine air flow is controlled by selectively adjusting position of the throttle valve and adjusting opening and closing of intake valves and exhaust valves that control airflow into each combustion chamber. An engine can be equipped with a variable valve actuation (VVA) system that includes cam phasing and a selectable multi-step valve lift, e.g., multiple cam lobes which provide two or more valve lift profiles to control openings and closings of the intake valves and exhaust valves. A change in the valve lift profile of the multi-step valve lift mechanism is a discrete change.

When an engine operates in the controlled auto-ignition combustion mode, engine control includes operating at a lean air-fuel ratio with the throttle wide open to minimize engine pumping losses. When an engine operates in the spark-ignition combustion mode, the engine control includes operating at a stoichiometric air-fuel ratio with the throttle valve controlled over a range of positions from 0% to 100% of the wide-open position to control intake airflow to achieve the stoichiometric air-fuel ratio. Engine output power is controlled by controlling fuel flow to the engine.

In an engine selectively operative in one of the spark-ignition combustion mode and the controlled auto-ignition combustion mode, transitioning between combustion modes can be complex. The engine controller must coordinate multiple actuators in order to provide the desired air-fuel ratio for the different modes. During a HCCI to SI transition, switching of the multi-step valve lift occurs nearly instantaneously and adjusting the cam phasings and the throttle includes slower dynamics. Engine torque disturbances and misfires may occur during combustion mode transitions when switching of the multi-step valve lift and adjusting cam phasing of the variable valve actuation system are not properly managed.

SUMMARY

An internal combustion engine includes variable cam phasing mechanisms and multi-step valve lift mechanisms operative to control phase and lift of intake and exhaust valves. The internal combustion engine is selectively operative in a first combustion mode and a second combustion mode. A method for operating the internal combustion engine includes commanding transitioning engine operation from the first combustion mode to the second combustion mode, adjusting phasings of the intake valves and the exhaust valves corresponding to a first intake air cylinder volume and a first residual gas cylinder volume, switching magnitude of lift of one of the intake valves and the exhaust valves corresponding to the second combustion mode, adjusting phasings of the intake valves and the exhaust valves corresponding to a second intake air cylinder volume and a second residual gas cylinder volume, switching magnitude of lift of the other of the intake valves and the exhaust valves corresponding to the second combustion mode, and adjusting phasings of the intake valves and the exhaust valves corresponding to a preferred intake air cylinder volume and a preferred residual gas cylinder volume for operating in the second combustion mode.

BRIEF DESCRIPTION OF THE DRAWINGS

One or more embodiments will now be described, by way of example, with reference to the accompanying drawings, in which.

DETAILED DESCRIPTION

Figure 1:
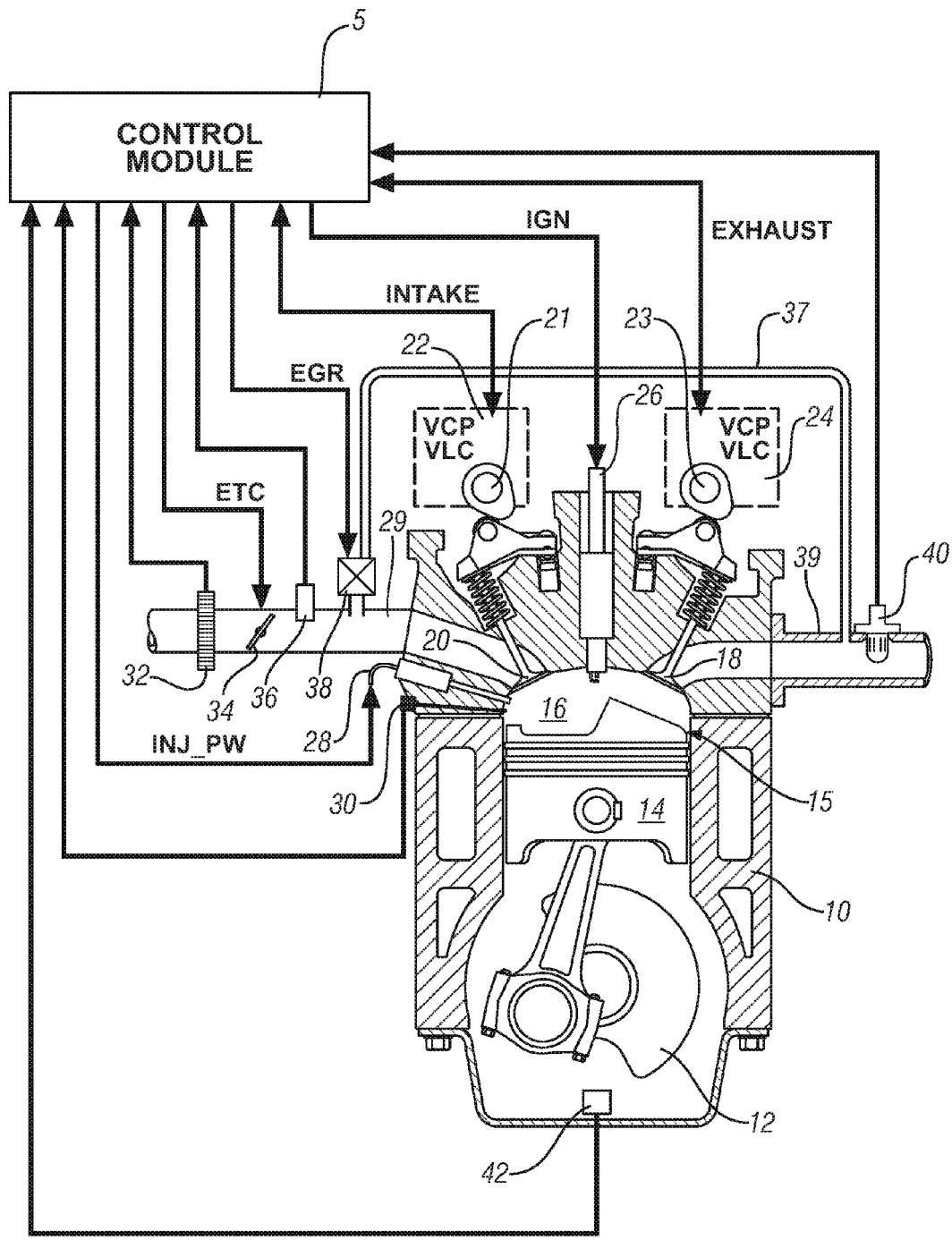
FIG. 1 is a schematic drawing of an exemplary engine system, in accordance with the disclosure.

Referring now to the drawings, wherein the showings are for the purpose of illustrating certain exemplary embodiments only and not for the purpose of limiting the same, FIG. 1 schematically illustrates an internal combustion engine 10 and accompanying control module 5 (CONTROL MODULE) that have been constructed in accordance with an embodiment of the disclosure. The engine 10 is selectively operative in a controlled auto-ignition combustion mode and a spark-ignition combustion mode. The engine 10 is selectively operative at a stoichiometric air/fuel ratio and at an air/fuel ratio that is primarily lean of stoichiometry. The disclosure can be applied to various internal combustion engine systems and combustion cycles.

The engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating piston travel is translated to rotational motion. A single one of the cylinders 15 is shown in FIG. 1.

An air intake system channels intake air to an intake manifold 29 which directs and distributes the air into an intake passage to each combustion chamber 16. The air intake system includes air flow ductwork and devices for monitoring and controlling the air flow. The devices preferably include a mass air flow sensor 32 for monitoring mass air flow and intake air temperature. A throttle valve 34, preferably including an electronically controlled device, controls air flow to the intake manifold 29 in response to a control signal (ETC) from the control module 5. A manifold pressure sensor 36 monitors manifold absolute pressure in the intake manifold 29. An external flow passage 37 having a flow control valve 38 can recirculate residual exhaust gases from an exhaust manifold 39 to the intake manifold 29. The flow control valve 38 is referred to hereinafter as an exhaust gas recirculation (EGR) valve 38. The control module 5 preferably controls mass flow of recirculated exhaust gas to the intake manifold 29 by controlling magnitude of opening of the EGR valve 38.

Air flow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift (VLC) of the intake valve(s) 20 and variably adjust and control phasing (VCP) of the intake camshaft 21 for each cylinder 15 in response to a control signal (INTAKE) from the control module 5. The exhaust VCP/VLC device 24 preferably includes a controllable mechanism operative to variably switch and control valve lift (VLC) of the exhaust valve(s) 18 and variably adjust and control phasing (VCP) of the exhaust camshaft 23 for each cylinder 15 in response to a control signal (EXHAUST) from the control module 5.

The intake and exhaust VCP/VLC devices 22 and 24 each preferably includes a controllable two-step VLC mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, including a plurality of high-pressure fuel injectors 28 each adapted to directly inject a mass of fuel into the combustion chamber 16, in response to a control signal (INJ_PW) from the control module 5. As used herein, fueling refers to a mass fuel flow into one of the combustion chambers 16. The fuel injectors 28 are supplied pressurized fuel from a fuel distribution system.

The engine 10 includes a spark-ignition system by which spark energy is provided to a spark plug 26 for igniting or assisting in igniting cylinder charges in each combustion chamber 16 in response to a control signal (IGN) from the control module 5. The spark plug 26 enhances control of combustion timing in each cylinder 15 of the engine 10 at certain conditions, e.g., during cold start and near a low load operation limit.

The engine 10 is preferably equipped with various sensing devices for monitoring engine operation, including a crank sensor 42 operative to monitor crankshaft rotational position, i.e., crank angle and speed, a wide range air/fuel ratio sensor 40 adapted to monitor air/fuel ratio in the exhaust gas feed-stream, and a combustion sensor 30 adapted to monitor in-cylinder combustion in real-time during ongoing operation of the engine 10. The combustion sensor 30 includes a device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Alternatively, other sensing systems can be used to monitor combustion parameters, including, e.g., ion-sense ignition systems and non-intrusive cylinder pressure monitoring systems.

Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used in the implementation of the present disclosure.

The control module 5 may take any suitable form including various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event. In operation, the control module 5 monitors inputs from the aforementioned sensors to determine states of engine parameters. The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. The control module 5 can operate to turn the engine on and off during ongoing vehicle operation, and can operate to selectively deactivate a portion of the combustion chambers or a portion of the valves through control of fuel and spark and valve deactivation.

Figure 2A:
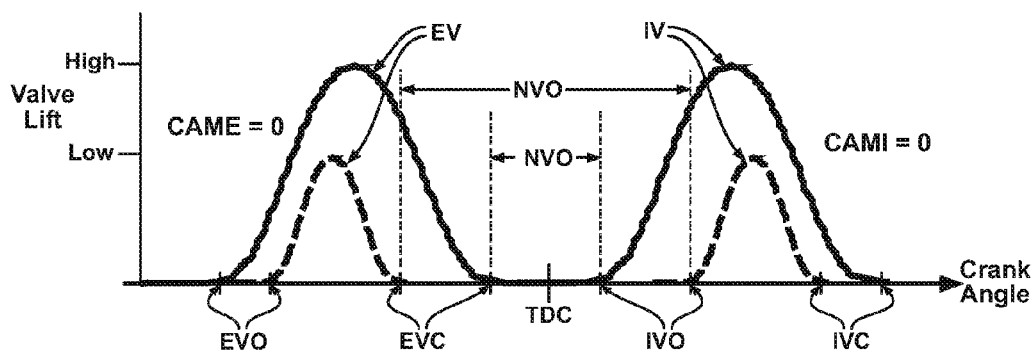
FIGS. 2A, 2B, 3 and 4 are graphical depictions, in accordance with the disclosure.
Figure 2B:
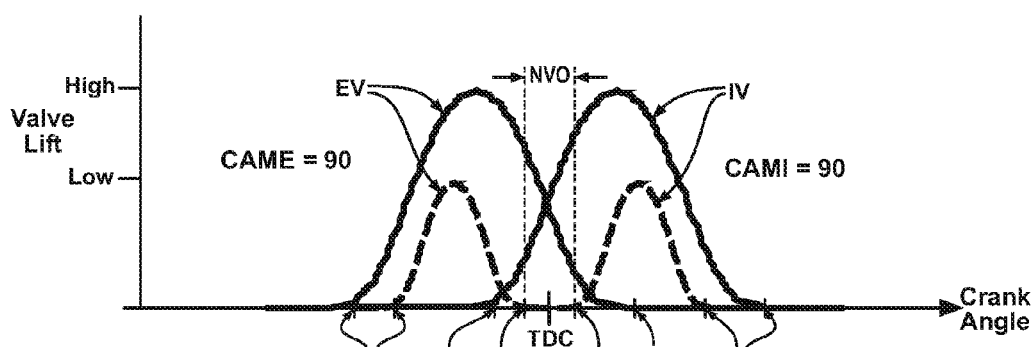

FIGS. 2A and 2B show openings and closings of the exhaust valve (EV) 18 and the intake valve (IV) 20 in relation to engine crank angle and relative to TDC when the VLC mechanisms of the intake and exhaust VCP/VLC devices 22 and 24 are controlled to the high-lift valve open position (High) and the low-lift valve open position (Low). FIG. 2A shows timings of openings and closings of the intake valve 20 and the exhaust valve 18 when the VCP mechanism of the intake VCP/VLC device 22 is adjusted to a first limit of phasing authority (CAMI=0) and the VCP mechanism of the exhaust VCP/VLC device 24 is adjusted to a first limit of phasing authority (CAME=0). This includes showings of exhaust valve openings (EVO) and closings (EVC) and intake valve openings (IVO) and closings (IVC) when operating at the high-lift valve open position (High) and the low-lift valve open position (Low). Periods of negative valve overlap (NVO) are shown, including periods between closing of the exhaust valve 18 and subsequent opening of the intake valve 20 during an engine cycle when operating at the high-lift valve open position (High) and the low-lift valve open position (Low).

FIG. 2B shows the timings of openings and closings of the intake valve 20 and the exhaust valve 18 when the VCP mechanism of the intake VCP/VLC device 22 is adjusted to a second limit of phasing authority (CAMI=90) and the VCP mechanism of the exhaust VCP/VLC device 24 is adjusted to a second limit of phasing authority (CAME=90). This includes showings of exhaust valve openings (EVO) and closings (EVC) and intake valve openings (IVO) and closings (IVC) when operating at the high-lift valve open position (High) and the low-lift valve open position (Low). Periods of NVO are shown and occur only when operating at the low-lift valve open position (Low). The first limits of phasing authority for the VCP mechanisms of the intake and exhaust VCP/VLC devices 22 and 24, i.e., CAMI=0 and CAME=0, are referred to as minimum phasings. The second limits of phasing authority for the VCP mechanisms of the intake and exhaust VCP/VLC devices 22 and 24, i.e., CAMI=90 and CAME=90, are referred to as maximum phasings.

An engine constructed as described hereinabove preferably operates in the spark-ignition combustion mode by switching the VLC mechanism of each of the intake and exhaust VCP/VLC devices 22 and 24 to the high-lift valve open position (High) and adjusting the VCP mechanism of each of the intake and exhaust VCP/VLC devices 22 and 24 to a predetermined NVO period.

An engine constructed as described hereinabove preferably operates in the controlled auto-ignition combustion mode by switching the VLC mechanism of each of the intake and exhaust VCP/VLC devices 22 and 24 to the low-lift valve open position (Low) and adjusting the VCP mechanism of each of the intake and exhaust VCP/VLC devices 22 and 24 to a predetermined NVO period.

A transition between the spark-ignition combustion mode and the controlled auto-ignition combustion mode can result in a command to switch the VLC mechanism of each of the intake and exhaust VCP/VLC devices 22 and 24 between the high-lift valve open position (High) and the low-lift valve open position (Low), or vice versa. The command to shift the VLC mechanisms of the intake and exhaust VCP/VLC devices 22 and 24 can result in abrupt changes in fresh intake air mass and residual gas mass in the combustion chamber 16. The fresh air mass in the cylinder 15 can be approximately calculated using the ideal gas law as follows:

$$m_a = \frac{p_i}{RT_i} V_{air} \quad [1]$$

wherein $m_a$ is the fresh air mass, $p_i$ is intake manifold pressure, $T_i$ is intake manifold temperature, R is the gas constant, and $V_{air}$ is volume, in this instance the effective cylinder volume for fresh air. The $$\frac{p_i}{RT_i}$$

term can be approximated as a constant value in one embodiment to facilitate calculations. The relationship in Eq. 1 can be used to determine the cylinder volume for fresh air $V_{air}$ for known levels of fresh air mass, intake manifold pressure, and intake manifold temperature.

The cylinder volume for fresh air $V_{air}$ is determined as follows:

$$V_{air} = V_{IVC}(CAMI) - V_{EVC}(CAME) \quad [2]$$

wherein $V_{IVC}$ is the cylinder volume at intake valve closing (IVC) determined as a function of the phasing of the intake cam angle (CAMI) and $V_{EVC}$ is the cylinder volume at exhaust valve closing (EVC) determined as a function of the phasing of the exhaust cam angle (CAME).

The residual gas mass can be determined from the cylinder volume for residual gas $V_{residual}$, which can be determined as a function of the phasing of the exhaust cam angle (CAME) as follows.

$$V_{residual} = V_{EVC}(CAME) \quad [3]$$

Figure 3:
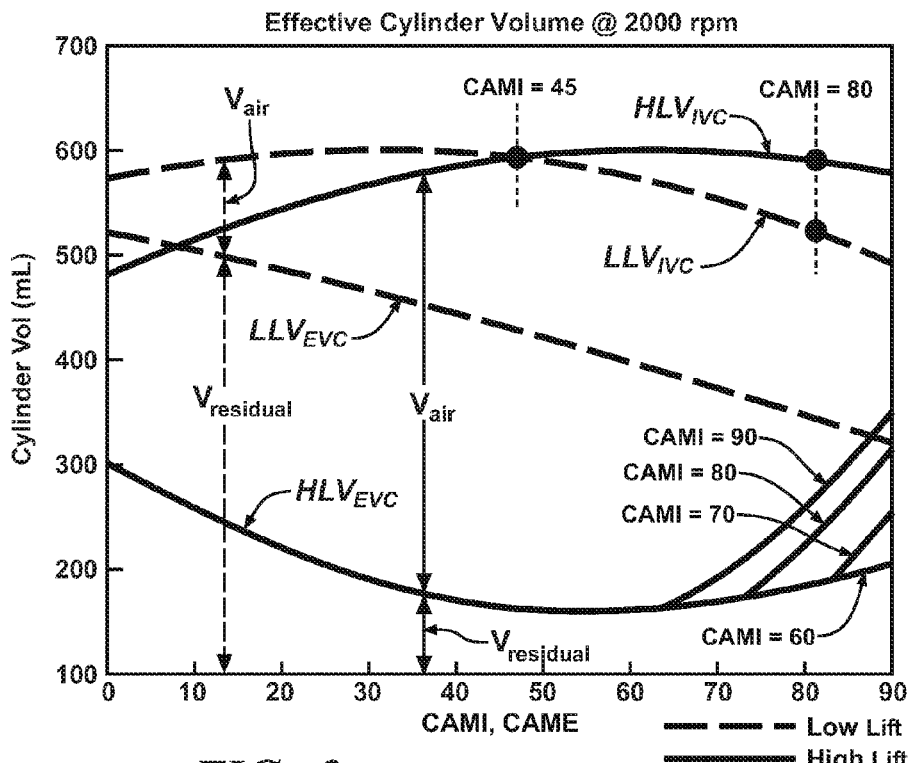

FIG. 3 graphically shows the cylinder volumes (Cyl. Vol (mL)) over ranges of the phasings of the intake and exhaust cam angles (CAMI and CAME) for an engine operating at a fixed engine speed (2000 rpm). The VCP mechanisms of the intake and exhaust VCP/VLC devices 22 and 24 are adjusted over ranges of phasing authority measured in intake and exhaust cam angles (CAMI and CAME) between the first and second limits of authority, ranging from 0 to 90 degrees in one embodiment. In the example, the phasings of the intake cam angle (CAMI) and the exhaust cam angle (CAME) are equal to zero degrees when the distance between the exhaust and intake valves 20 and 18 are maximized within the cam phasing authority. FIG. 3 depicts lines including cylinder volume plotted as a function of valve lift and phasing of the intake and exhaust valves, based upon the following relationships.

HL $V_{IVC}$: effective cylinder volume corresponding to the intake valve closing when the VLC mechanism of the intake VCP/VLC device 22 is controlled to the high-lift valve open position (HIGH);

LL $V_{IVC}$: effective cylinder volume corresponding to the intake valve closing when the VLC mechanism of the intake VCP/VLC device 22 is controlled to the low-lift valve open position (LOW);

LL $V_{EVC}$: effective cylinder volume corresponding to the exhaust valve closing when the VLC mechanism of the exhaust VCP/VLC device 24 is controlled to the low-lift valve open position (LOW); and HL $V_{EVC}$: effective cylinder volume corresponding to the exhaust valve closing when the VLC mechanism of the exhaust VCP/VLC device 24 is controlled to the high-lift valve open position (HIGH).

The cylinder volumes for fresh air $V_{air}$ and the cylinder volumes for residual gas $V_{residual}$ can be determined for the exemplary system, using cylinder volumes shown in FIG. 3 based upon the relationships described with reference to Eqs. 1, 2, and 3 above. These relationships can be used to determine operating schemes that minimize abrupt changes in cylinder volume during any transition between operating in the controlled auto-ignition combustion mode and the spark-ignition combustion mode that results in a command to change the VLC mechanisms of the intake and exhaust VCP/VLC devices 22 and 24 between the low-lift valve open position (LOW) and the high-lift valve open position (HIGH), and vice versa.

When both the intake and exhaust valves 20 and 18 operate at the high-lift valve open positions and the phasings of the intake and exhaust cam angles (CAMI and CAME) are greater than 60 degrees, a positive valve overlap (PVO) occurs between the intake and exhaust valves 20 and 18. The residual gas volume and mass in the combustion chamber 16 increases with increases in the phasings of the intake and exhaust cam angles (CAMI and CAME).

When the exhaust VLC mechanism of the exhaust VLC/VCP 24 is switched between the high-lift valve open position (HIGH) and the low-lift valve open position (LOW), and vice versa, the cylinder volumes $V_{air}$ and $V_{EVC}$ do not change as long as the intake valve 20 is adjusted to operate at the high-lift valve open position and the phasing of the intake cam angle (CAMI) is equal to 80 degrees when the phasing of the exhaust cam angle (CAME) is equal to 90 degrees.

When the exhaust valve 18 operates at the low-lift valve open position (LOW), the cylinder volume corresponding to exhaust valve closing $V_{EVC}$ can be monotonically adjusted by adjusting the exhaust valve timing using the exhaust VCP mechanism of the exhaust VLC/VCP 24 to adjust the phasing of the exhaust cam angle (CAME).

When the exhaust valve 18 operates at the high-lift valve open position (HIGH), the cylinder volume corresponding to exhaust valve closing $V_{EVC}$ can be monotonically adjusted by adjusting the phasing of the intake cam angle (CAMI) when the phasing of the exhaust cam angle (CAME) is greater than approximately 65 degrees. The control authority of the intake valve timing over the range of the cylinder volume corresponding to exhaust valve closing $V_{EVC}$ is maximized as the phasing of the exhaust cam angle (CAME) approaches 90 degrees.

When the intake valve 20 operates at the low-lift valve open position (LOW), the cylinder volume corresponding to the intake valve closing $V_{IVC}$ decreases, and thus the volumetric efficiency decreases as the phasing of the intake cam angle (CAMI) is adjusted greater than approximately 45 degrees. The cylinder volume corresponding to the intake valve closing $V_{IVC}$ is almost insensitive to the phasing of the intake cam angle (CAMI) when the intake cam angle (CAMI) is less than 45 degrees.

When the intake valve 20 operates at the high-lift valve open position (HIGH), the cylinder volume corresponding to the intake valve closing $V_{IVC}$ begins to decrease as the phasing of the intake cam angle (CAMI) decreases to less than 45 degrees. The cylinder volume corresponding to the intake valve closing $V_{IVC}$ is nearly insensitive to changes in the phasing of the intake cam angle (CAMI) when the intake cam angle (CAMI) is greater than 45 degrees.

Thus, a logical sequence is derived to individually switch the VLC mechanism of the intake VCP/VLC device 22 between the high-lift valve open position (HIGH) and the low-lift valve open position (LOW) and individually switch the VLC mechanism of the exhaust VCP/VLC device 24 between the high-lift valve open position and the low-lift valve open position. Concurrent with individually switching the VLC mechanism, the VCP mechanism of the intake VCP/VLC device 22 can be adjusted over the range of phasing authority of the intake cam angle (CAMI) and the VCP mechanism of the exhaust VCP/VLC device 24 can be adjusted over the allowable range of phasing of the exhaust cam angle (CAME). This operation can happen during a transition between operating in first and second combustion modes for the engine 10, and described with reference to operating in the spark-ignition combustion mode and operating in the controlled auto-ignition combustion mode in one embodiment. This operation includes commanding transitioning engine operation from one of the spark-ignition and the controlled auto-ignition combustion modes to the other of the spark-ignition and the controlled auto-ignition combustion modes.

A first step in transitioning between the combustion modes includes adjusting the VCP mechanisms of the intake and exhaust VLC/VCP devices 22 and 24 to change the phasings of the intake cam angle (CAMI) and the exhaust cam angle (CAME) to positions that correspond to a first intake air cylinder volume ($V_{air}$) and a first residual gas cylinder volume ($V_{residual}$). The phasings of the intake cam angle (CAMI) and the exhaust cam angle (CAME) corresponding to the first intake air cylinder volume and first residual gas cylinder volume are preferably selected such that a change in magnitude of lift of one of the intake valve 20 and the exhaust valve 18 has minimal or no effect on the intake air cylinder volume and residual gas cylinder volume, as can be determined based upon combustion stability.

A second step in transitioning between the combustion modes includes switching the VLC mechanism of one of the intake and exhaust VLC/VCP devices 22 and 24 to change magnitude of lift of one of the intake valves 20 and the exhaust valves 18 corresponding to the second, target combustion mode.

A third step in transitioning between the combustion modes includes adjusting the VCP mechanisms of the intake and exhaust VLC/VCP devices 22 and 24 to change phasings of the intake valves 20 and the exhaust valves 18 to change the phasings of the intake cam angle (CAMI) and the exhaust cam angle (CAME) to positions corresponding to a second intake air cylinder volume and a second residual gas cylinder volume. The phasings of the intake cam angle (CAMI) and the exhaust cam angle (CAME) corresponding to the second intake air cylinder volume and second residual gas cylinder volume are preferably selected such that a change in magnitude of lift of the other of the intake valves 20 and the exhaust valves 18 has minimal or no effect on the intake air cylinder volume and residual gas cylinder volume as can be determined based upon combustion stability.

A fourth step in transitioning between the combustion modes includes switching the VLC mechanism of the other of the intake and exhaust VLC/VCP devices 22 and 24 to change magnitude of lift of the other of the intake valves 20 and the exhaust valves 18 corresponding to the second, target combustion mode.

A fifth step in transitioning between the combustion modes includes adjusting the VCP mechanisms of the intake and exhaust VLC/VCP devices 22 and 24 to change the phasings of the intake cam angle (CAMI) and the exhaust cam angle (CAME) to positions corresponding to a preferred intake air cylinder volume and a preferred residual gas cylinder volume for operating in the second combustion mode.

In one embodiment, operating states are defined to establish a step-by-step control strategy to effect combustion mode transitions in the engine 10. The step-by-step control strategy includes steps as follows.

S1: controlled auto-ignition combustion mode is requested when the VLC mechanisms of both the intake and exhaust VLC/VCP devices 22 and 24 are switched to open the intake and exhaust valves 20 and 18 in the high-lift valve open position;

S2: controlled auto-ignition combustion mode is requested when the VLC mechanisms of the intake and exhaust VLC/VCP devices 22 and 24 are switched to open the intake valve 20 to the high-lift valve open position and open the exhaust valve 18 to the low-lift valve open position;

S3: controlled auto-ignition combustion mode is requested when the VLC mechanisms of the intake and exhaust VLC/VCP devices 22 and 24 are switched to open both the intake and exhaust valves 20 and 18 to the low-lift valve open position;

S4: spark-ignition combustion mode is requested when the VLC mechanisms of the intake and exhaust VLC/VCP devices 22 and 24 are switched to open both the intake and exhaust valves 20 and 18 to the low-lift valve open position;

S5: spark-ignition combustion mode is requested when the VLC mechanisms of the intake and exhaust VLC/VCP devices 22 and 24 are switched to open the intake valve 20 to the high-lift valve open position and open the exhaust valve 18 to the low-lift valve open position; and S6: spark-ignition combustion mode is requested when the VLC mechanisms of both the intake and exhaust VLC/VCP devices 22 and 24 are switched to open the intake and exhaust valves 20 and 18 in the high-lift valve open position.

Control strategies corresponding to the aforementioned operating states are implemented, with valve timings calibrated such that phasings of the exhaust and intake cam angles (CAME and CAMI) are always greater than 65 and 45 degrees, respectively, in the SI combustion mode.

Thus, when operating in the S1 operating state the phasing of the intake cam angle (CAMI) is adjusted to achieve a desired fresh air cylinder volume $V_{air}$ while moving the phasing of the exhaust cam angle (CAME) toward 90 degrees whereat control authority of intake valve timing over the cylinder volume at exhaust valve closing $V_{EVC}$ is at its maximum. Phasings of both the exhaust and intake cam angles (CAME and CAMI) approach 90 degrees since the desired fresh air cylinder volume $V_{air}$ significantly decreases in the controlled auto-ignition combustion mode. When the cylinder volume at exhaust valve closing $V_{EVC}$ in the low-lift valve open position is less than the cylinder volume at exhaust valve closing $V_{EVC}$ in the high-lift valve open position (LL $V_{EVC}$<HL $V_{EVC}$) upon approaching the 90 degrees, the VLC mechanism of the exhaust VLC/VCP device 24 switches from opening the exhaust valve 18 in the high-lift valve open position to the low-lift valve open position.

Thus, when operating in the S2 operating state the phasing of the exhaust cam angle (CAME) is adjusted to achieve the fresh air cylinder volume $V_{air}$ while moving phasing of the intake cam angle (CAMI) towards 45 degrees where the cylinder volume at intake valve closing $V_{IVC}$ in the low-lift valve open position (LL $V_{IVC}$) is equal to cylinder volume at intake valve closing $V_{IVC}$ in the high-lift valve open position (HL $V_{IVC}$). The cylinder volume at intake valve closing $V_{IVC}$ in the high-lift valve open position (HL $V_{IVC}$) is insensitive to intake valve timing until it reaches to 45 degrees in one embodiment. Thus, moving intake valve timing does not disturb the effective cylinder volumes. When the cylinder volume at intake valve closing $V_{IVC}$ in the high-lift valve open position (HL $V_{IVC}$) is equal to cylinder volume at intake valve closing $V_{IVC}$ in the low-lift valve open position (LL $V_{IVC}$), the VLC mechanism of the intake VLC/VCP device 22 switches from opening the intake valve 20 at the high-lift valve open position to the low-lift valve open position.

Thus, when operating in the S3 operating state phasing of the exhaust cam angle (CAME) is controlled to achieve the desired fresh air cylinder volume $V_{air}$ while adjusting the phasing of the intake cam angle (CAMI) to the minimum value of the phasing of the exhaust cam angle (CAME) and 45 degrees to achieve symmetry between phasings of openings and closings of the intake and exhaust valves 20 and 18 to reduce pumping losses. The phasing of the intake cam angle (CAMI) is limited to lower than 45 degrees to avoid a sudden decrease in volumetric efficiency.

Thus, when operating in the S4 operating state the phasing of the exhaust cam angle (CAME) is adjusted to achieve the desired fresh air cylinder volume $V_{air}$ while adjusting the phasing of the intake cam angle (CAMI) toward 45 degrees. The cylinder volume at intake valve closing $V_{IVC}$ in the low-lift valve open position (LL $V_{IVC}$) is equal to cylinder volume at intake valve closing $V_{IVC}$ in the high-lift valve open position (HL $V_{IVC}$). The cylinder volume at intake valve closing $V_{IVC}$ in the low-lift valve open position (LL $V_{IVC}$) is insensitive to intake valve timing until it reaches to 45 degrees, and thus, moving intake valve timing does not disturb the effective cylinder volumes. When the cylinder volume at intake valve closing $V_{IVC}$ in the low-lift valve open position (LL $V_{IVC}$) is equal to the cylinder volume at intake valve closing $V_{IVC}$ in the high-lift valve open position (HL $V_{IVC}$), the VLC mechanism of the intake VLC/VCP device 22 switches from opening the intake valve 20 at the low-lift valve open position to opening at the high-lift valve open position.

Thus, when operating in the S5 operating state phasing of the exhaust cam angle (CAME) is adjusted to achieve the desired fresh air cylinder volume $V_{air}$ while adjusting phasing of the intake cam angle (CAMI) toward 90 degrees. Eventually, the phasings of both the intake and exhaust valves (CAMI and CAME) approach 90 degrees since the desired fresh air cylinder volume $V_{air}$ increases in the SI combustion mode. When the cylinder volume at exhaust valve closing $V_{EVC}$ in the low-lift valve open position (LL $V_{EVC}$) is less than the cylinder volume at exhaust valve closing $V_{EVC}$ in the high-lift valve open position (HL $V_{EVC}$) as the phasings of the intake and exhaust valves (CAMI and CAME) approach 90 degrees, the VLC mechanism of the exhaust VLC/VCP device 24 switches opening the exhaust valve 18 from the low-lift valve open position to the high-lift valve open position.

Thus, when operating in the S6 operating state phasing of the intake cam angle (CAMI) is controlled to achieve the desired fresh air cylinder volume $V_{air}$, while slowly adjusting phasing of the exhaust cam angle (CAME) to a calibrated value in the spark-ignition combustion mode such that phasing of the intake valve 20 has control authority over cylinder volume at exhaust valve closing $V_{EVC}$.

Figure 4:
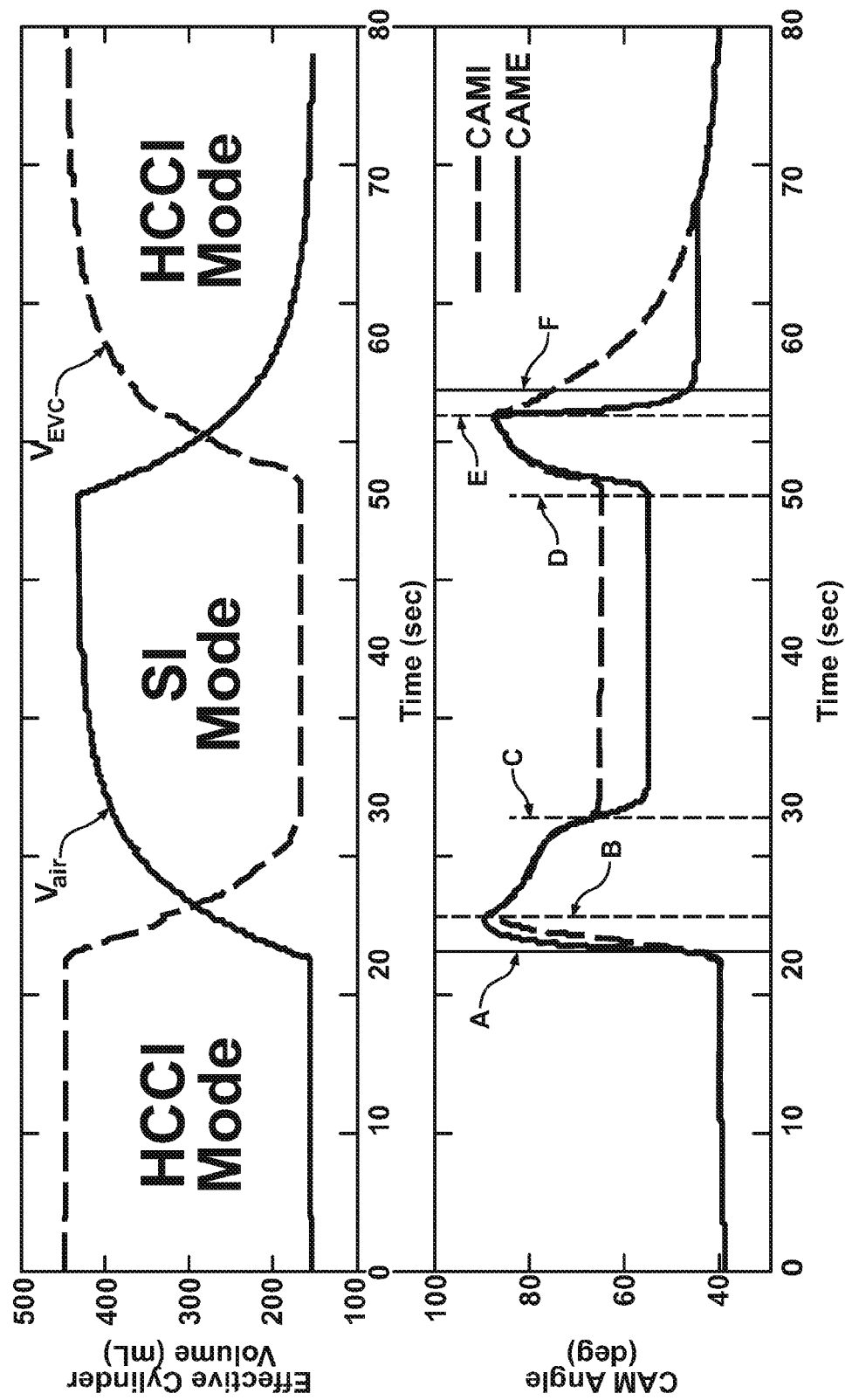

FIG. 4 graphically shows results of a simulation executed using the system described herein, the simulation determining and depicting the effective cylinder volumes including the fresh air cylinder volume $V_{air}$ and the cylinder volume at exhaust valve closing $V_{EVC}$. Point A indicates a point in time at which a transition is commanded from the controlled auto-ignition combustion mode (HCCI Mode) to the spark-ignition combustion mode (SI Mode). Effective cylinder volumes including the fresh air cylinder volume $V_{air}$ and the cylinder volume at exhaust valve closing $V_{EVC}$ are plotted over time. The phasing of the exhaust cam angle (CAME) and the phasing of the intake cam angle (CAMI) are shown in a time-corresponding graph.

Initially, the engine 10 is operating in the controlled auto-ignition combustion mode (HCCI Mode), with both the intake and exhaust valves 20 and 18 opening to the low-lift valve open position.

At point A, there is a command to transition to the spark-ignition combustion. This includes executing the first step in transitioning between the combustion modes. The VCP mechanisms of the intake and exhaust VLC/VCP devices 22 and 24 are adjusted starting at point A to change the phasings of the intake cam angle (CAMI) and the exhaust cam angle (CAME) to positions that correspond to a first intake air cylinder volume $V_{air}$ and a first residual gas cylinder volume $V_{residual}$, which is achieved at point B.

At point B, the second step in transitioning between the combustion modes is executed, including switching the VLC mechanism of one of the intake and exhaust VLC/VCP devices 22 and 24 to change magnitude of lift of one of the intake valves 20 and the exhaust valves 18 corresponding to the second, target combustion mode. Switching one of the VLC mechanisms happens instantaneously.

The third step begins at point B, including adjusting the VCP mechanisms of the intake and exhaust VLC/VCP devices 22 and 24 to change phasings of the intake valves 20 and the exhaust valves 18 to change the phasings of the intake cam angle (CAMI) and the exhaust cam angle (CAME) to positions corresponding to a second intake air cylinder volume and a second residual gas cylinder volume. Adjusting of the VCP mechanisms of the intake and exhaust VLC/VCP devices 22 and 24 occurs between points B and C.

At point C, the fourth step in transitioning between the combustion modes is executed, including switching the VLC mechanism of the other of the intake and exhaust VLC/VCP devices 22 and 24 to change magnitude of lift of the other of the intake valves 20 and the exhaust valves 18 corresponding to the second, target combustion mode. Switching the other VLC mechanism happens instantaneously.

Subsequent to point C, the fifth step in transitioning between the combustion modes is executed, including adjusting the VCP mechanisms of the intake and exhaust VLC/VCP devices 22 and 24 to change the phasings of the intake cam angle (CAMI) and the exhaust cam angle (CAME) to positions corresponding to a preferred intake air cylinder volume and a preferred residual gas cylinder volume for operating in the second combustion mode. The process is shown in reverse for a transition from the spark-ignition combustion mode to the controlled auto-ignition combustion mode, with transition points D, E, and F.

The results indicate that the intake air cylinder volume $V_{air}$ and the residual gas cylinder volume $V_{residual}$ can be controlled and changed in a continuous manner when switching the intake and exhaust valves between the low-lift valve open position and the high-lift valve open position during combustion mode transitions. In the simulation, the fresh air cylinder volume $V_{air}$ increases when the combustion mode changes from controlled auto-ignition combustion mode to the spark-ignition combustion mode. In one embodiment, engine operation further includes controlling pressure in the intake manifold 29 by controlling position of the throttle 34 to achieve the desired airflow for a preferred fresh air cylinder volume $V_{air}$ as can be determined using Eq. 1.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating an internal combustion engine including variable cam phasing mechanisms and multi-step valve lift mechanisms operative to control phase and lift of intake and exhaust valves, the internal combustion engine selectively operative in a first combustion mode and a second combustion mode, the method comprising:
   commanding transitioning engine operation from the first combustion mode to the second combustion mode;
   adjusting phasings of the intake valves and the exhaust valves corresponding to a first intake air cylinder volume and a first residual gas cylinder volume;
   switching magnitude of lift of one of the intake valves and the exhaust valves corresponding to the second combustion mode;
   adjusting phasings of the intake valves and the exhaust valves corresponding to a second intake air cylinder volume and a second residual gas cylinder volume;
   switching magnitude of lift of the other of the intake valves and the exhaust valves corresponding to the second combustion mode; and
   adjusting phasings of the intake valves and the exhaust valves corresponding to a preferred intake air cylinder volume and a preferred residual gas cylinder volume for operating in the second combustion mode.

2. The method of claim 1, wherein the first combustion mode comprises a spark-ignition combustion mode and the second combustion mode comprises a controlled auto-ignition combustion mode;
   the method further comprising:
   adjusting phasing of the intake valves to achieve a maximum phasing;
   adjusting phasing of the exhaust valves to achieve a maximum phasing;
   switching magnitude of lift of the exhaust valves from a high-lift valve open position to a low-lift valve open position when a residual gas cylinder volume corresponding to the low-lift valve open position is less than a residual gas cylinder volume corresponding to the high-lift valve open position;
   adjusting phasing of the intake valves to achieve an effective cylinder volume corresponding to the intake valve closing at a low-lift valve open position that is equal to the effective cylinder volume corresponding to the intake valve closing at a high-lift valve open position; and switching magnitude of lift of the intake valves from a high-lift valve open position to a low-lift valve open position.

3. The method of claim 1, wherein the first combustion mode comprises a controlled auto-ignition combustion mode and the second combustion mode comprises a spark-ignition combustion mode;
the method further comprising:
adjusting phasing of the exhaust valves to achieve the first selected intake air cylinder volume;
adjusting phasing of the exhaust valves to achieve the first selected residual gas cylinder volume;
switching magnitude of lift of the intake valves from a low-lift valve open position to a high-lift valve open position when an effective cylinder volume corresponding to the intake valve closing at the low-lift valve open position is equal to the effective cylinder volume corresponding to the intake valve closing at the high-lift valve open position;
adjusting phasing of the intake valves to a maximum phasing;
switching magnitude of lift of the exhaust valves from a low-lift valve open position to a high-lift valve open position when an effective cylinder volume corresponding to the exhaust valve closing at the low-lift valve open position is less than the effective cylinder volume corresponding to the exhaust valve closing at the high-lift valve open position.

4. Method for controlling operation of an internal combustion engine including variable cam phasing mechanisms and two-step valve lift control mechanisms operative to control phasing of intake and exhaust valves and operative to control magnitude of lift of the intake and exhaust valves to one of two discrete steps, the method comprising:
commanding switching the magnitude of lift of the intake and exhaust valves from first discrete steps to second discrete steps;
adjusting phasings of the intake valves and the exhaust valves corresponding to a first intake air cylinder volume and a first residual gas cylinder volume;
switching magnitude of lift of one of the intake valves and the exhaust valves from the first corresponding discrete step to the second corresponding discrete step;
adjusting phasings of the intake valves and the exhaust valves corresponding to a second intake air cylinder volume and a second residual gas cylinder volume; and
switching magnitude of lift of the other of the intake valves and the exhaust valves from the first corresponding discrete step to the second corresponding discrete step.

5. The method of claim 4, further comprising adjusting phasings of the intake valves and the exhaust valves corresponding to a preferred intake air cylinder volume and a preferred residual gas cylinder volume subsequent to switching magnitude of lift of the other of the intake valves and the exhaust valves from the first corresponding discrete step to the second corresponding discrete step.

6. Method for controlling a direct injection internal combustion engine selectively operating in a plurality of engine operating modes and comprising a cylinder, an exhaust valve, and an intake valve, the intake and exhaust valves each selectively operating in a plurality of valve lift settings and selectively operating with a variable valve actuation timing, the method comprising:
monitoring a current engine operating mode comprising a current exhaust valve lift setting and a current intake valve lift setting;
monitoring a desired engine operating mode comprising a desired exhaust valve lift setting and a desired intake valve lift setting;
determining a valve transition scheme based upon the current exhaust valve lift setting, the current intake valve lift setting, the desired exhaust valve lift setting, and a desired intake valve lift setting; and
utilizing the valve transition scheme to transition from the current engine operating mode to the desired engine operating mode;
wherein the valve transition scheme comprises:
a substantially continuous change to an effective cylinder volume for air throughout the transition; and
a substantially continuous change to an effective cylinder volume for residual gas throughout the transition.

7. The method of claim 6, wherein utilizing the valve transition scheme comprises selectively controlling the variable valve actuation timing of each of the valves and the valve lift settings of each of the valves.

8. The method of claim 6, wherein the substantially continuous change to the effective cylinder volume for air comprises transitioning from the current intake valve lift setting to the desired intake valve lift setting at a point calibrated to provide a substantially equal effective cylinder volume for air for the current intake valve lift setting and the desired intake valve lift setting.

9. The method of claim 6, wherein the substantially continuous change to the effective cylinder volume for residual gas comprises transitioning from the current exhaust valve lift setting to the desired exhaust valve lift setting at a point calibrated to provide a substantially equal effective cylinder volume for residual gas for the current exhaust valve lift setting and the desired exhaust valve lift.

10. The method of claim 6, wherein the current engine operating mode is a spark-ignition mode; and
wherein the desired engine operating mode is a homogeneous charge compression-ignition mode.

11. The method of claim 10, wherein the current exhaust valve lift setting is a first high-lift setting;
wherein the current intake valve lift setting is a second high-lift setting; and
wherein determining the valve transition scheme further comprises:
transitioning the exhaust valve from the first high-lift setting to a first low-lift setting, comprising:
controlling the variable valve actuation timing of the exhaust valve to a setting close to a maximum positive overlap position for the exhaust valve;
controlling the variable valve actuation timing of the intake valve to a setting close to a maximum positive overlap position for the intake valve;
comparing an estimated effective cylinder volume for residual gas corresponding to the variable valve actuation timing of the exhaust valve at the setting close to the maximum positive overlap position at the first high-lift setting to an estimated effective cylinder volume for residual gas corresponding to the variable valve actuation timing of the exhaust valve at the setting close to the maximum positive overlap position at the first low-lift setting; and
controlling the exhaust valve from the first high-lift setting to the first low-lift setting if the estimated effective cylinder volume for residual gas at the first high-lift setting is greater than the estimated effective cylinder volume for residual gas at the first low-lift setting; and subsequently transitioning the intake valve from the second high-lift setting to a second low-lift setting, comprising:
controlling the variable valve actuation timing of the intake valve away from the setting close to the maximum positive overlap position;
comparing an estimated effective cylinder volume for air corresponding to the variable valve actuation timing of the intake valve at the second high-lift setting to an estimated effective cylinder volume for air corresponding to the variable valve actuation timing of the intake valve at the second low-lift setting; and
controlling the intake valve from the second high-lift setting to the second low-lift setting if the estimated effective cylinder volume for air at the second high-lift setting is substantially equal to the estimated effective cylinder volume for air at the second low-lift setting.

12. The method of claim 10, wherein the current exhaust valve lift setting is a first high-lift setting;
wherein the current intake valve lift setting is a second high-lift setting; and
wherein determining the valve transition scheme further comprises:
transitioning the exhaust valve from the first high-lift setting to a first low-lift setting, comprising:
controlling the variable valve actuation timing of the intake valve to a setting close to a maximum positive overlap position for the intake valve;
controlling the variable valve actuation timing of the exhaust valve to a calibrated setting corresponding to an estimated effective cylinder volume for residual gas with the exhaust valve in the first high-lift setting being substantially equal to an estimated effective cylinder volume for residual gas with the exhaust valve in the first low-lift setting; and
controlling the exhaust valve from the first high-lift setting to the first low-lift setting; and
subsequently transitioning the intake valve from the second high-lift setting to a second low-lift setting, comprising:
controlling the variable valve actuation timing of the intake valve to a calibrated setting corresponding to an estimated effective cylinder volume for air with the intake valve in the second high-lift setting being substantially equal to an estimated effective cylinder volume for air with the intake valve in the second low-lift setting; and
controlling the intake valve from the second high-lift setting to the second low-lift setting.

13. The method of claim 10, wherein the current exhaust valve lift setting is a first high-lift setting;
wherein the current intake valve lift setting is a second high-lift setting; and
wherein determining the valve transition scheme further comprises:
decreasing the effective cylinder volume for air and increasing the effective cylinder volume for residual gas by:
controlling the variable valve actuation of the exhaust valve and the variable valve actuation of the intake valve toward a maximum positive overlap position for each of the valves to a calibrated setting whereat the exhaust valve can be changed from the first high-lift setting to a first low-lift setting with substantially zero change to the effective cylinder volume for residual gas;
changing the exhaust valve from the first high-lift setting to the first low-lift setting;
controlling the variable valve actuation of the exhaust valve away from the maximum positive overlap position to increase the effective cylinder volume for residual gas;
controlling the variable valve actuation of the intake valve away from the maximum positive overlap position to a calibrated setting whereat the intake valve can be changed from the second high-lift setting to a second low-lift setting with substantially zero change to the effective cylinder volume for air;
changing the intake valve from the second high-lift setting to the second low-lift setting; and
controlling the variable valve actuation of the exhaust valve based upon the desired engine operating mode to control the effective cylinder volume for air and the effective cylinder volume for residual gas.

14. The method of claim 10, wherein the current exhaust valve lift setting is a first low-lift setting;
wherein the current intake valve lift setting is a high-lift setting; and
wherein determining the valve transition scheme comprises:
transitioning the intake valve from the high-lift setting to a second low-lift setting, comprising:
controlling the variable valve actuation timing of the intake valve to a calibrated setting corresponding to an estimated effective cylinder volume for air with the intake valve in the high-lift setting being substantially equal to an estimated effective cylinder volume for air with the intake valve in the second low-lift setting; and
controlling the intake valve from the high-lift setting to the second low-lift setting.

15. The method of claim 6, wherein the current engine operating mode is a homogeneous charge compression-ignition mode; and
wherein the desired engine operating mode is a spark-ignition mode.

16. The method of claim 15, wherein the current intake valve lift setting is a first low-lift setting;
wherein the current exhaust valve lift setting is a second low-lift setting; and
wherein determining the valve transition scheme further comprises:
transitioning the intake valve from the first low-lift setting to a first high-lift setting, comprising:
controlling the variable valve actuation timing of the intake valve toward a setting close to a maximum positive overlap position for the intake valve;
comparing an estimated effective cylinder volume for air corresponding to the variable valve actuation timing of the intake valve at the first low-lift setting to an estimated effective cylinder volume for air corresponding to the variable valve actuation timing of the intake valve at the first high-lift setting; and
controlling the intake valve from the first low-lift setting to the first high-lift setting if the estimated effective cylinder volume for air at the first low-lift setting is equal to the estimated effective cylinder volume for air at the first high-lift setting; and subsequently transitioning the exhaust valve from the second low-lift setting to a second high-lift setting, comprising:

controlling the variable valve actuation timing of the exhaust valve to a setting close to a maximum positive overlap position for the exhaust valve;

controlling the variable valve actuation timing of the intake valve to the setting close to the maximum positive overlap position for the intake valve;

comparing an estimated effective cylinder volume for residual gas corresponding to the variable valve actuation timing of the exhaust valve at the setting close to the maximum positive overlap position at the second low-lift setting to an estimated effective cylinder volume for residual gas corresponding to the variable valve actuation timing of the exhaust valve at the setting close to a positive overlap position at the second high-lift setting; and controlling the exhaust valve from the second low-lift setting to the second high-lift setting if the estimated effective cylinder volume for residual gas at the second high-lift setting is greater than the estimated effective cylinder volume for residual gas at the second low-lift setting.

17. The method of claim 15, wherein the current intake valve lift setting is a first low-lift setting;

wherein the current exhaust valve lift setting is a second low-lift setting; and wherein determining the valve transition scheme further comprises:

transitioning the intake valve from the first low-lift setting to a first high-lift setting, comprising:

controlling the variable valve actuation timing of the intake valve to a calibrated setting corresponding to an estimated effective cylinder volume for air with the intake valve in the first low-lift setting being substantially equal to an estimated effective cylinder volume for air with the intake valve in the first high-lift setting; and controlling the intake valve from the first low-lift setting to the first high-lift setting; and subsequently transitioning the exhaust valve from the second low-lift setting to a second high-lift setting, comprising:

controlling the variable valve actuation timing of the intake valve to a setting close to a maximum positive overlap position for the intake valve;

controlling the variable valve actuation timing of the exhaust valve to a calibrated setting corresponding to an estimated effective cylinder volume for residual gas with the exhaust valve in the second low-lift setting being substantially equal to an estimated effective cylinder volume for residual gas with the exhaust valve in the second high-lift setting; and controlling the exhaust valve from the second low-lift setting to the second high-lift setting.

18. The method of claim 15, wherein the current intake valve lift setting is a first low-lift setting;

wherein the current exhaust valve lift setting is a second low-lift setting; and wherein determining the valve transition scheme further comprises:

increasing the effective cylinder volume for air and decreasing the effective cylinder volume for residual gas by:

controlling the variable valve actuation of the intake valve to a calibrated setting whereat the intake valve can be changed from the first low-lift setting to a first high-lift setting with substantially zero change to the effective cylinder volume for air;

changing the intake valve from the first low-lift setting to the first high-lift setting;

controlling the variable valve actuation of the exhaust valve and the variable valve actuation of the intake valve toward a maximum positive overlap position to a calibrated setting whereat the exhaust valve can be changed from the second low-lift setting to a second high-lift setting with substantially zero change to the effective cylinder volume for residual gas;

changing the exhaust valve from the second low-lift setting to the second high-lift setting; and controlling the variable valve actuation of the exhaust valve based upon the desired engine operating state to control the effective cylinder volume for air and the effective cylinder volume for residual gas.

19. The method of claim 15, wherein the current exhaust valve lift setting is a low-lift setting;

wherein the current intake valve lift setting is a first high-lift setting; and wherein determining the valve transition scheme further comprises:

transitioning the exhaust valve from the low-lift setting to a second high-lift setting, comprising:

controlling the variable valve actuation timing of the exhaust valve to a calibrated setting corresponding to an estimated effective cylinder volume for residual gas with the exhaust valve in the second high-lift setting being substantially equal to an estimated effective cylinder volume for residual gas with the exhaust valve in the low-lift setting; and controlling the exhaust valve from the low-lift setting to the second high-lift setting.

* * * * *